(12) United States Patent
Dellock et al.

(10) Patent No.: US 10,766,299 B2
(45) Date of Patent: Sep. 8, 2020

(54) VEHICLE WHEEL ASSEMBLY

(71) Applicant: Ford Global Technologies, LLC, Dearborn, MI (US)

(72) Inventors: Paul Kenneth Dellock, Northville, MI (US); Stuart C. Salter, White lake, MI (US); Richard Gall, Ann Arbor, MI (US); David Brian Glickman, Southfield, MI (US); Samer Wadi, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 15/871,386

(22) Filed: Jan. 15, 2018

(65) Prior Publication Data

US 2019/0217659 A1    Jul. 18, 2019

(51) Int. Cl.
| | | |
|---|---|---|
| *B60B 7/08* | (2006.01) | |
| *B60B 7/06* | (2006.01) | |
| *B60B 7/00* | (2006.01) | |
| *G03H 1/00* | (2006.01) | |

(52) U.S. Cl.
CPC .......... *B60B 7/0073* (2013.01); *B60B 7/0053* (2013.01); *B60B 7/066* (2013.01); *B60B 7/08* (2013.01); *B60B 2310/204* (2013.01); *B60B 2310/318* (2013.01); *B60B 2310/648* (2013.01); *B60B 2310/656* (2013.01); *B60B 2360/32* (2013.01); *G03H 2001/0055* (2013.01); *G03H 2223/23* (2013.01)

(58) Field of Classification Search
CPC ..... B60B 7/0053; B60B 7/0073; B60B 7/066; B60B 7/08; B60Q 1/326
See application file for complete search history.

(56) References Cited

U.S. PATENT DOCUMENTS

| | | | | |
|---|---|---|---|---|
| 1,539,394 | A * | 5/1925 | Leeman | ................. B60Q 1/326 362/500 |
| 7,874,713 | B2 * | 1/2011 | Kwon | .................... B60Q 1/326 362/464 |
| 9,688,215 | B1 * | 6/2017 | Dellock | ................ B60R 13/005 |
| 2003/0047987 | A1 * | 3/2003 | Enomoto | .................. B60B 1/08 301/37.101 |
| 2004/0125612 | A1 * | 7/2004 | Jackson | ................. B60Q 1/326 362/500 |
| 2005/0040697 | A1 * | 2/2005 | Carmona | ................ B60B 7/004 301/95.101 |
| 2005/0225160 | A1 * | 10/2005 | Barnes | .................... B60B 7/006 301/37.101 |
| 2006/0255652 | A1 * | 11/2006 | Kaufman | .................. B60B 7/20 301/37.25 |

(Continued)

FOREIGN PATENT DOCUMENTS

| | | |
|---|---|---|
| CN | 101386717 A | 7/2012 |
| CN | 1055008985 A | 4/2016 |

(Continued)

*Primary Examiner* — Kip T Kotter
(74) *Attorney, Agent, or Firm* — David Coppiellie; Price Heneveld LLP

(57) ABSTRACT

A vehicle wheel assembly includes a wheel. A tire is disposed around the wheel. A wheel cap is coupled to the wheel and includes a polymeric base. A substantially transparent cap is positioned on the base which defines a first surface and a second surface. The second surface integrally defines an optical grating.

20 Claims, 7 Drawing Sheets

(56) References Cited

U.S. PATENT DOCUMENTS

| | | | |
|---|---|---|---|
| 2008/0111419 A1* | 5/2008 | Stahel | B60B 7/006 |
| | | | 301/37.41 |
| 2008/0273176 A1* | 11/2008 | Lloyd | G03B 21/06 |
| | | | 353/50 |
| 2014/0103701 A1* | 4/2014 | Chung | B60B 3/008 |
| | | | 301/108.1 |
| 2014/0204344 A1 | 7/2014 | Harris | |
| 2015/0239286 A1* | 8/2015 | Boswell-Horstmeyer | ........... |
| | | | B60B 7/0053 |
| | | | 301/37.26 |
| 2016/0311251 A1* | 10/2016 | Hodges | B60B 7/14 |

FOREIGN PATENT DOCUMENTS

| | | |
|---|---|---|
| DE | 19529309 A | 6/1997 |
| JP | 11078402 | 3/1999 |
| KR | 101276411 | 11/2012 |

* cited by examiner

VEHICLE WHEEL ASSEMBLY

FIELD OF THE INVENTION

The present disclosure generally relates to wheel assemblies, and more particularly to vehicle wheel assemblies.

BACKGROUND OF THE INVENTION

Wheel assemblies may offer a location for manufacturers of vehicles and/or vehicle components to place aesthetically pleasing articles. Accordingly, new wheel assemblies may be advantageous.

SUMMARY OF THE INVENTION

According to one feature of the present disclosure, a vehicle wheel assembly includes a wheel. A tire is disposed around the wheel. A wheel cap is coupled to the wheel including a polymeric base. A substantially transparent cap is positioned on the base which defines a first surface and a second surface. The second surface integrally defines an optical grating.

According to another feature of the present disclosure, a vehicle wheel assembly includes a wheel. A tire is disposed around the wheel. A wheel cap is coupled to the wheel including a base decorative layer positioned on a polymeric base. A substantially transparent cap is positioned on the base which defines an inboard surface and an outboard surface. The inboard surface is proximate the polymeric base and integrally defines a holographic grating. A cap decorative layer is positioned around the holographic grating.

According to yet another feature of the present disclosure, a method of producing a wheel cap is provided which includes the steps of: forming a polymeric base; injection molding a substantially transparent polymer into a mold defining an optical grating feature; solidifying the polymer in the optical grating feature to form a cap defining an optical grating on a surface; applying a cap decorative layer on the surface around the optical grating; and coupling the surface of the cap to the polymeric base.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
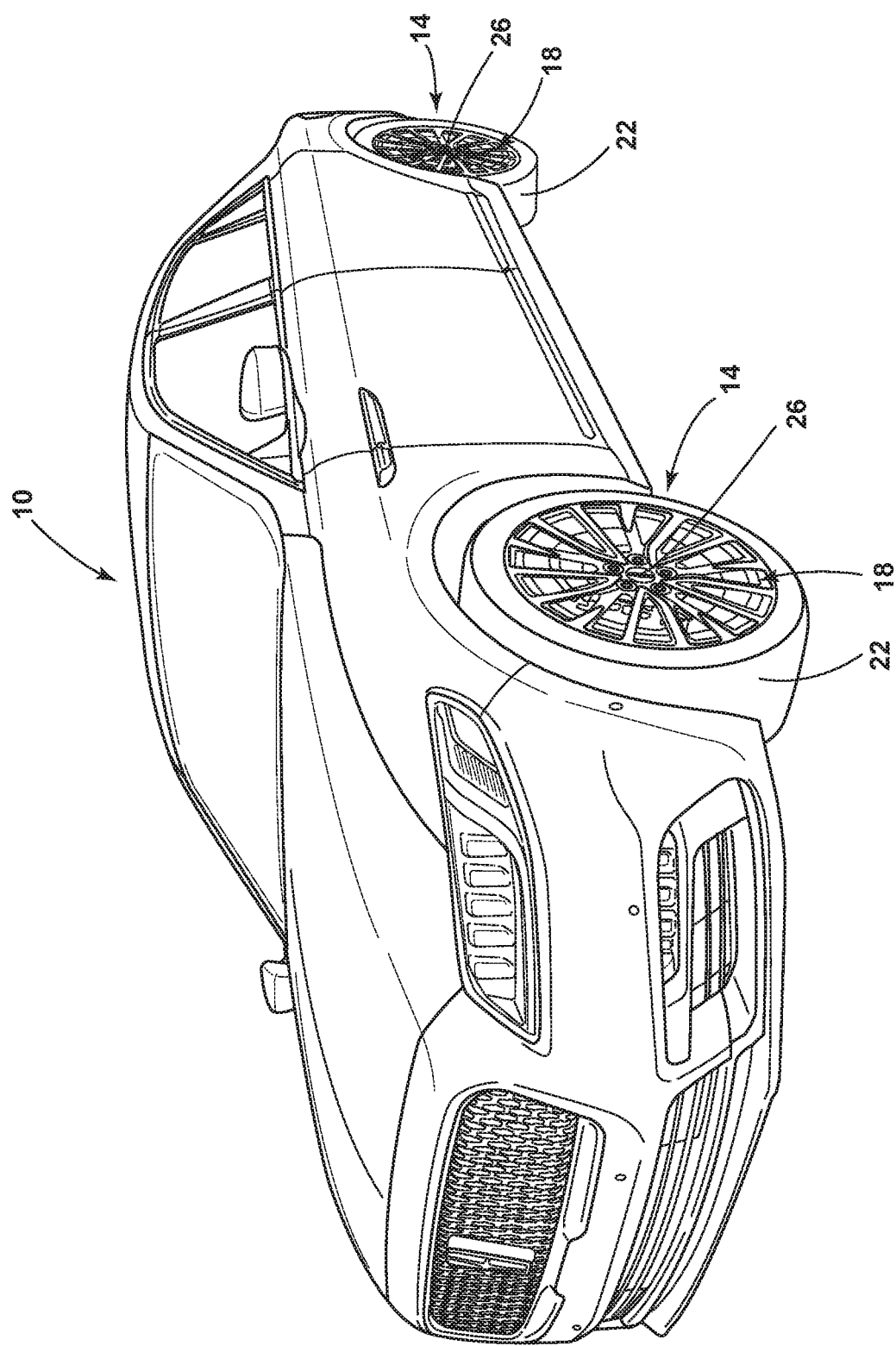
FIG. 1 is a perspective view of a vehicle, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Figure 2A:
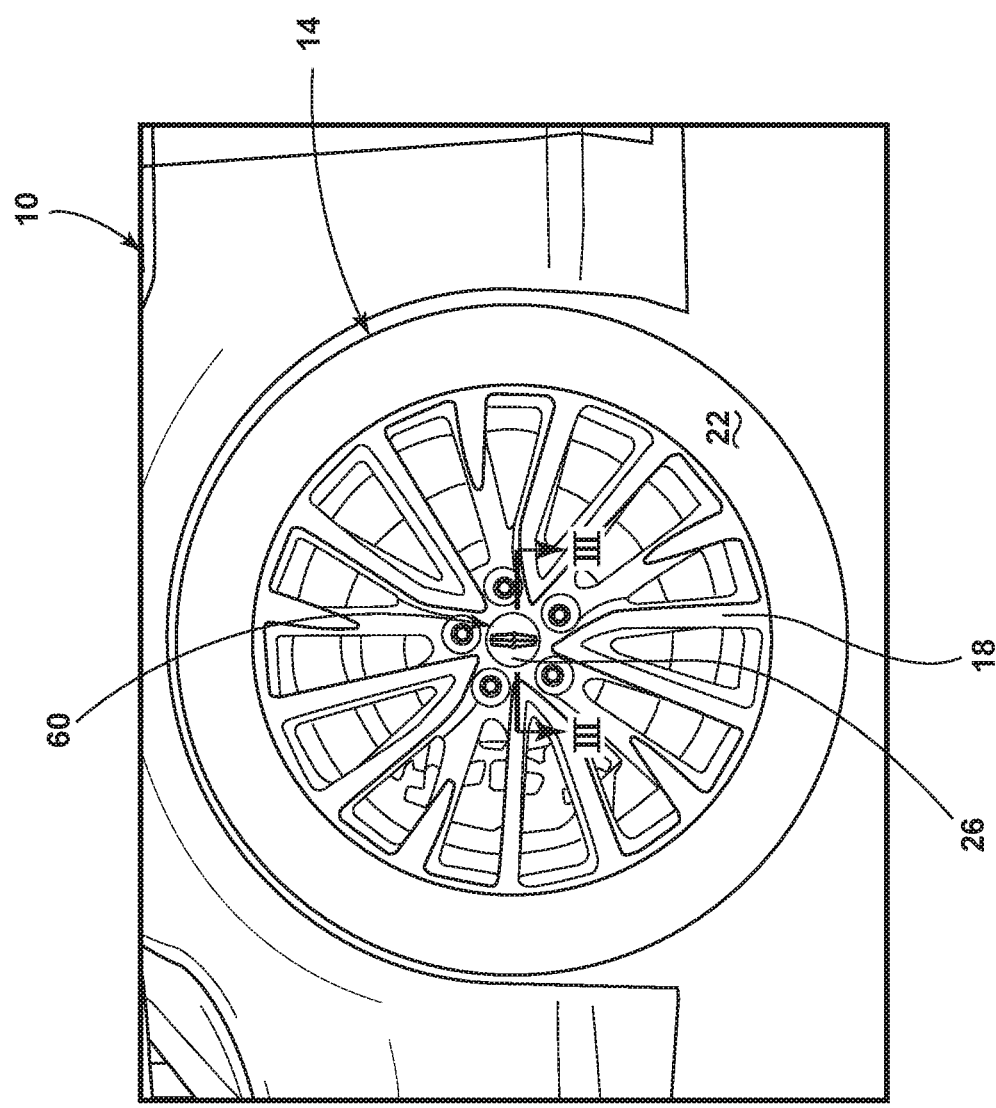
FIG. 2A is an elevation view of a vehicle wheel assembly, according to at least one example.
Figure 2B:
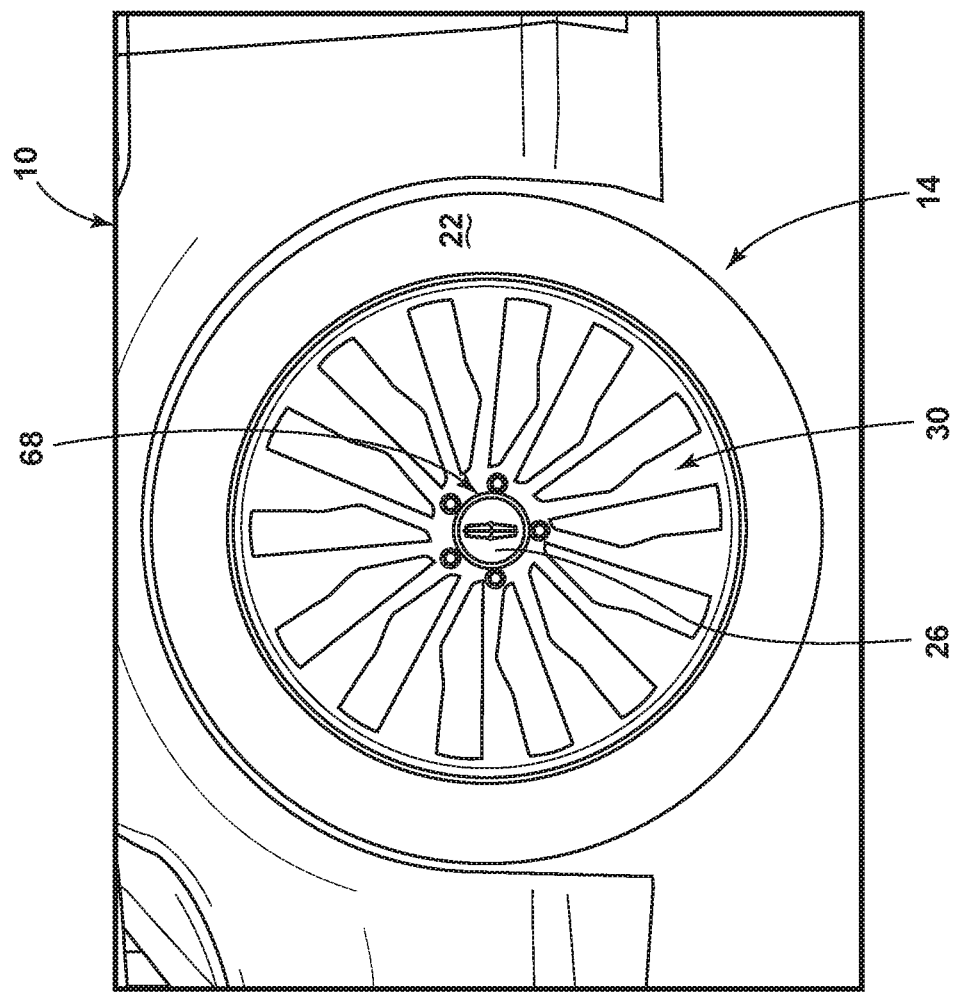
FIG. 2B is an elevation view of a vehicle wheel assembly including a hub cap, according to at least one example.
Figure 3:
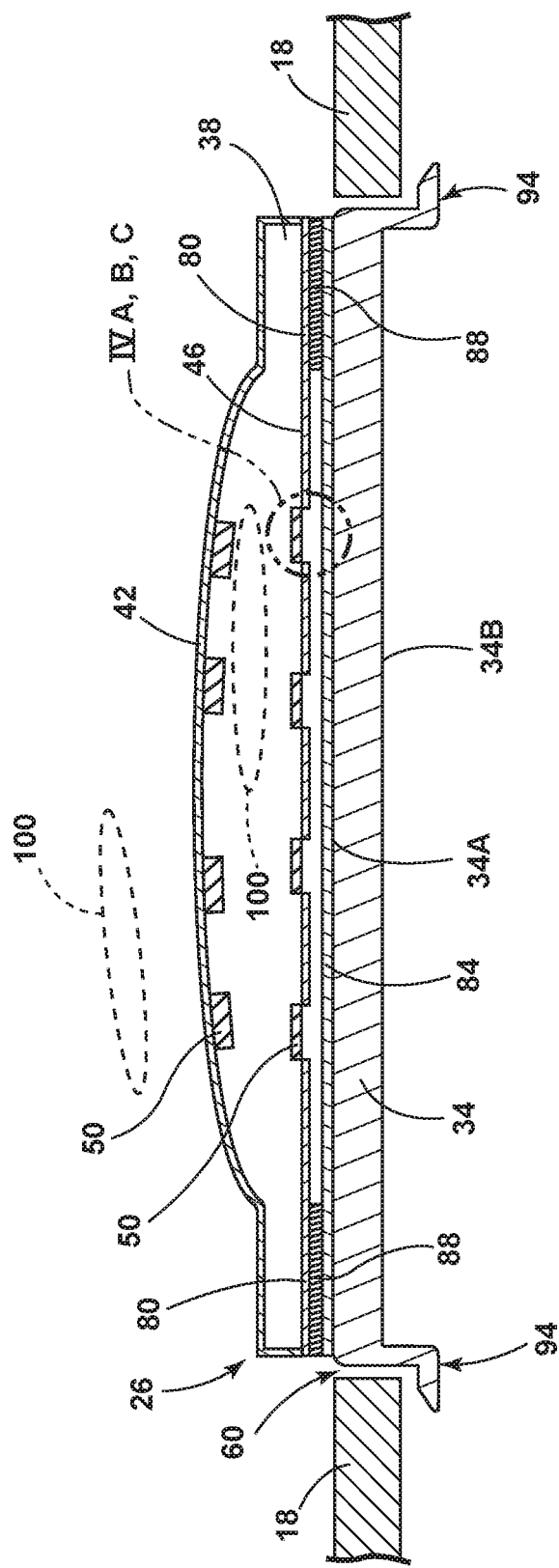
FIG. 3 is a cross-sectional view taken at line III of FIG. 2A, according to at least one example.

Referring now to FIGS. 1-3, depicted is a vehicle 10 including a vehicle wheel assembly 14. The vehicle wheel assembly 14 includes a wheel 18, a tire 22 disposed around the wheel 18 and a wheel cap 26 coupled to the wheel 18. In some examples, the wheel assembly 14 of the vehicle 10 may include a hub cap 30. The wheel cap 26 may include a base 34 and a cap 38 positioned on the base 34. The cap 38 may define a first surface 42 and a second surface 46. According to various examples, the second surface 46 may integrally define an optical grating 50.

Referring now to FIG. 1, the vehicle 10 is depicted as a car, but it will be understood that the vehicle 10 may be a truck, van, motorcycle, sport-utility vehicle and/or crossover. The vehicle 10 includes a plurality of wheel assemblies 14 which are positioned around the vehicle 10. It will be understood that the present disclosure may be applied to any wheel assembly 14 positioned around the vehicle 10. As will be explained in greater detail below, the wheel cap 26 may be either directly coupled to the wheel 18 or the hub cap 30 (FIG. 2B). For purposes of this disclosure, the term directly coupled to the wheel 18 means that the wheel cap 26 is positioned on, or otherwise attached to the wheel 18 without the use of the hub cap 30. It will be understood that that the wheel assembly 14 may include a plurality of wheel caps 26. The wheel cap 26 may be positioned on other locations of the wheel assembly 14 than the center. Further, the structure of the wheel cap 26 may be incorporated in other locations around the vehicle 10 (e.g., badges, aesthetic trip pieces, etc.).

Referring now to FIGS. 1 and 2A, the tire 22 may be composed of a rubber and/or rubber composite material as known in the art. The tires 22 are positioned around the wheels 18. The wheels 18 of the vehicle 10 may be formed of a metal and/or composite material. The wheels 18 have a circular shape and may define one or more spokes. In the depicted examples, the wheels 18 define an aperture 60 within which the wheel cap 26 couples. The aperture 60 may be a well or other depression within the wheel configured to hold the wheel cap 26. It will be understood that the wheel cap 26 may additionally or alternatively be coupled directly to a surface or other structure of the wheel 18 without departing from the teachings provided herein. For example the wheel cap 26 may be adhesively or mechanically bonded with the wheel 18.

Referring now to FIG. 2B, the wheel assembly 14 may include the hub cap 30. In such examples the hub cap 30 may partially or fully cover the wheel 18. For example, the hub cap 30 is positioned over a portion of the wheel 18. The hub cap 30 may generally be positioned over a center of the wheel 18. The hub cap 30 may couple to wheel 18 at a single point, or at a plurality of points. For example, the hub cap 30 may be coupled to the wheel 18 at lug nuts which secure the wheel 18 to the vehicle 10. The hub cap 30 may be composed of a polymeric material, a metal and/or combinations thereof. In polymeric examples of the hub cap 30, the hub cap 30 may include a vacuum metallized surface or other metallic coating. The hub cap 30 may contain movable components and/or decorative appliques. In examples of the vehicle 10 which include the hub cap 30, the hub cap 30 may define a hub cap aperture 68. The hub cap aperture 68 may be a well or other depression configured to hold the wheel cap 26. It will be understood that the wheel cap 26 may additionally or alternatively be coupled directly to a surface or other structure of the hub cap 30 without departing from the teachings provided herein. For example the wheel cap 26 may be adhesively or mechanically bonded with the hub cap 30.

Referring now to FIG. 3, the wheel cap 26 may include the base 34, the cap 38, a cap decorative layer 80, a base decorative layer 84 and an adhesive layer 88. The base 34 may be composed of a metal, ceramic, polymer, composite material and/or combinations thereof. According to various examples, the base 34 may be composed of a polymeric material. The polymeric material of the base 34 may be composed of low-density polyethylene, high-density polyethylene, polypropylene, polyvinyl chloride, polystyrene, nylon, teflon, thermoplastic polyurethanes, polycarbonate, silicone, other polymeric materials and/or combinations thereof. The base 34 may be dyed or otherwise colored to provide an aesthetically pleasing appearance. The base 34 defines a first surface 34A and a second surface 34B. The first surface 34A may alternatively be referred to as a base surface. The first and/or second surfaces 34A, 34B of the base 34 may be flat or may be curved. In some examples, portions of the first and/or second surfaces 34A, 34B may be flat and other portions curved. The base 34 may define one or more attachment features 94. The attachment features 94 may be formed as clips, hooks, protrusions, receiving slots or other mechanical components configured to couple the base 34 of the wheel cap 26 to the wheel 18 and/or to the hub cap 30. As such, the base 34 may define one or more attachment features 94 on an opposite side of the base 34 than the cap 38.

The base decorative layer 84 is disposed across the first surface 34A of the base 34. The base decorative layer 84 may be composed of a film, paint, ink, an applique, dye and/or combinations thereof. For example, the base decorative layer 84 may be composed of a vacuum metallized layer to provide the base 34 with a reflective luster. The base decorative layer 84 may extend across a portion, a majority, substantially all or all of the first surface 42 of the base 34. The base decorative layer 84 may be continuous or have a discontinuous pattern. The base decorative layer 84 may be homogenous across the first surface 42 of the base 34 or it may be different. For example, portions of the base decorative layer 84 may be formed of a vacuum metallized layer which provides a reflective luster, while other portions of the base decorative layer 84 are a paint to provide a specific color. As such, by altering the use of different types of the base decorative layer 84, the base decorative layer 84 may form one or more patterns, logos, alphanumeric text, indicia, images or combinations thereof.

The adhesive layer 88 is disposed, or positioned, on the base 34 and/or base decorative layer 84. In other words, the adhesive layer 88 may not be present in a central region of the wheel cap 26 or the wheel cap 26 may be free of the adhesive layer 88. It will be understood that additionally or alternatively the adhesive layer 88 may be disposed on the cap decorative layer 80. The adhesive layer 88 may be composed of a pressure sensitive adhesive, a glue, an epoxy, a polyurethane adhesive, a polyimide adhesive and/or combinations thereof. The adhesive layer 88 may be disposed across a portion, a majority, substantially all or all of the base decorative layer 84. In some examples, the adhesive layer 88 may be positioned around a perimeter of the base decorative layer 84 while in other examples the adhesive layer 88 is disposed in a center of the base decorative layer 84. The adhesive layer 88 is configured to retain the cap 38 and the base 34 together after assembly of the wheel 26. Use of the adhesive layer 88 may be advantageous in sealing the cap 38 to the base 34 and preventing penetration of water, dirt and/or road grime into the wheel cap 26.

The cap 38 may be composed of a metal, ceramic, polymer, composite material and/or combinations thereof. According to various examples, the cap 38 may be composed of a polymeric material. The polymeric material of the cap 38 may be composed of low-density polyethylene, high-density polyethylene, acrylic, polypropylene, polyvinyl chloride, polystyrene, nylon, teflon, thermoplastic polyurethanes, polycarbonate, silicone, other polymeric materials and/or combinations thereof. In some examples, the cap 38 may be composed of more than one material such that the cap 38 is layered or otherwise has a segmented structure. For example, the cap 38 may include one or more coatings (e.g., hard coatings, antireflection coating and/or decorative coatings). The cap 38 may be clear, dyed, tinted or otherwise colored to provide an aesthetically pleasing appearance. According to various examples, the cap 38 may be composed of an optically transparent polymeric material. For example, the cap 38 is substantially transparent to the visible wavelengths of light (e.g., from about 400 nm to about 700 nm). In such examples, the cap 38 may be configured to transmit about 5% or greater, about 10% or greater, about 15% or greater, about 20% or greater, about 25% or greater, about 30% or greater, about 35% or greater, about 40% or greater, about 45% or greater, about 50% or greater, about 55% or greater, about 60% or greater, about 65% or greater, about 70% or greater, about 75% or greater, about 80% or greater, about 85% or greater, about 90% or greater, about 95% or greater, or about 99% of light of the visible wavelength band. As explained above, the cap 38 defines the first surface 42 and the second surface 46. The first surface 42 may be an outboard, exterior, surface of the cap 38 while the second surface may be an inboard, or interior, surface of the cap 38. In other words, the second surface 46 of the cap 38 is closer to the wheel 18 than the first surface 42. The first and/or second surfaces 42, 46 of the cap 38 may be flat or may be curved. In some examples, portions of the first and/or second surfaces 42, 46 may be flat and other portions curved. The first and/or second surfaces 42, 46 of the cap 38 may define optical gratings 50. As will be explained in greater detail below, the optical gratings 50 may be diffraction gratings, holographic gratings or combinations thereof. The optical gratings 50 may be integrally defined by the first and/or second surfaces 42, 46. The optical gratings 50 may themselves define one or more indicia, logos, images, alphanumeric text and combinations thereof to the shape of the optical gratings 50.

The cap decorative layer 80 is disposed across the second surface 46 of the cap 38. The cap decorative layer 80 may be composed of a film, ink, paint, an applique, dye and/or combinations thereof. For example, the cap decorative layer 80 may be composed of a vacuum metallized layer to provide the cap 38 with a reflective luster (i.e., as the cap decorative layer 80 may be seen through optically transparent examples of the cap 38). The cap decorative layer 80 may extend across a portion, a majority, substantially all or all of the second surface 46 of the cap 38. The cap decorative layer 80 may be continuous or have a discontinuous pattern. The cap decorative layer 80 may be homogenous across the second surface 46 of the cap 38 or it may be different. For example, portions of the cap decorative layer 80 may be formed of a vacuum metallized layer which provides a reflective luster, while other portions of the cap decorative layer 80 are a paint to provide a specific color. In yet other examples, different colored paints may be used across the cap decorative layer 80. As such, by altering the use of different types of the cap decorative layer 80, the cap decorative layer 80 may form one or more patterns, logos, alphanumeric text, indicia, images or combinations thereof. According to various examples, the cap decorative layer 80 may outline, extend around the perimeter of, or "window" the one or more optical gratings 50 positioned on the second surface 46 of the cap 38.

In an assembled state, the base decorative layer 84, the cap decorative layer 80 and the optical gratings 50 may be used in conjunction with one another to produce an aesthetically pleasing effect. For example, the cap decorative layer 80 may be positioned on and optically transparent example of the cap 38 such that the base decorative layer 84 is only visible through the optical grating 50. In other words, because the cap decorative layer 80 surrounds the optical grating 50, the cap 38 may appear to have the properties (e.g., color, reflectivity, etc.) of the cap decorative layer 80 while the optical grating 50 has the properties (e.g., color, reflectivity, etc.) of the base decorative layer 84.

Figure 4A:
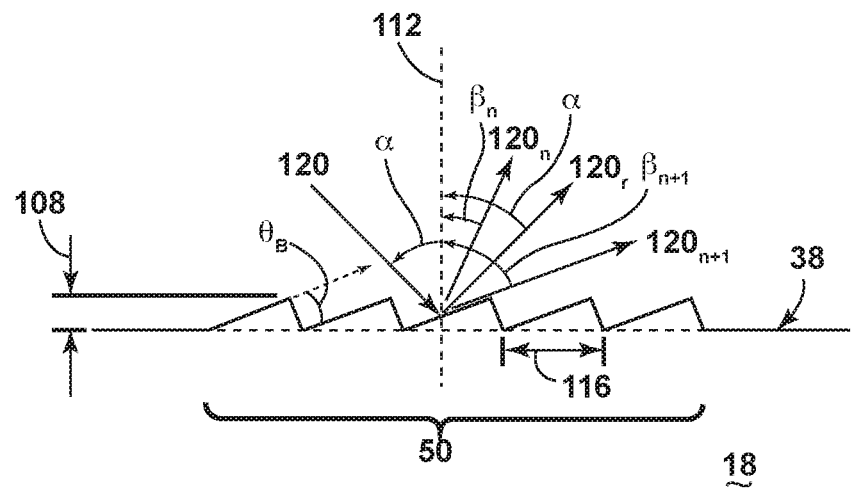
FIG. 4A is an enhanced view taken at section IVA of FIG. 3, according to at least one example.
Figure 4B:
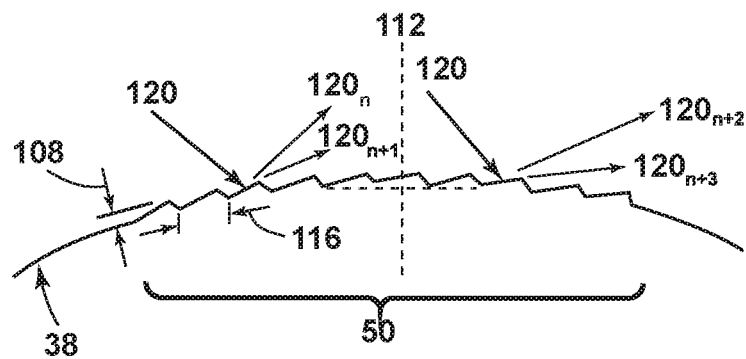
FIG. 4B is an enhanced view taken at section IVB of FIG. 3, according to at least one example.

The optical gratings 50 may be at least one of a holographic grating and a diffraction grating. According to various examples, one or more of the optical gratings 50 may be a holographic grating. The gratings 50 may be formed by defining one or more features configured to form an interference pattern. The features of the optical grating 50 may be ridges, variations in opacity, density or surface profile. Ambient light from around the vehicle 10 and/or wheel assembly 14 falling on the 50 diffracts into a light field which forms a projected image 100. The projected image 100 may also be known as a hologram. The light field which forms the projected image 100 may exhibit visual depth queues such as parallax and perspective that change realistically with any change in the relative position of the observer (e.g., an occupant within an interior of the vehicle 10). As the projected image 100 exhibits a depth and changes with changing perspective of the observer, the projected image 100 is a hologram. The projected image 100 may appear to "float" or "hover" over the wheel cap 26. In yet other examples, the projected image 100 may appear to be encased within the cap 38. The projected image 100 may take a variety of configurations including alpha numeric text, symbols (e.g., vehicle make or model symbols, star pattern, etc.), as well as pictures Referring now to FIGS. 4A and 4B, the optical grating 50 may be a diffraction grating configured to produce an iridescent pattern to light impinging upon it. As such, the optical grating 50 may be referred to as a diffraction grating 50. The diffraction grating 50 may be present on a flat example of the cap 38 (FIG. 4A) on a curved embodiment of the cap 38 (FIG. 4B), or on other shapes of the cap 38. For example, the diffraction grating 50 may be configured to reflect light of different wavelengths in different directions. The diffraction grating 50 may have a thickness 108 that ranges from about 250 nm to about 1000 nm. The thickness 108 of the diffraction grating 50, for example, should be maintained in the range of about 250 nm to about 1000 nm according to one embodiment to ensure that the portions of the cap 38 which include the diffraction gratings 50 exhibits a jewel-like appearance through light diffraction upon illumination in direct ambient lighting while also having a minimal effect on the optical clarity of the cap 38 under non-direct ambient lighting. Preferably, the thickness 108 of the diffraction grating 50 ranges from about 390 nm to 700 nm. In other examples, the thickness 108 of the diffraction gratings 50 ranges from 500 nm to 750 nm. As depicted in FIG. 4A in exemplary form, the diffraction grating 50 may have a sawtooth or triangular shape. In three dimensions, these gratings 50 can appear with a stepped or sawtooth shape without angular features, pyramidal in shape, or some combination of stepped and pyramidal shapes. Other shapes of the diffraction grating 50 include hill-shaped features (e.g., sinusoidal or curved shaped features). The diffraction grating 50 can also include portions with a combination of triangular and hill-shaped features. More generally, the shapes of the grating 50 should be such that an effective blazing angle $\theta_B$ of at least 15 degrees is present for one or more portions of each grating, tooth or groove of the diffraction grating 50. The blaze angle $\theta_B$ is the angle between step normal (i.e., the direction normal to each step or tooth of the grating 50) and a direction normal 112 to the first and/or second surfaces 42, 46 having the diffraction grating 50.

Generally, the blaze angle $\theta_B$ is optimized to maximize the efficiency of the wavelength(s) of the incident light which may be typical ambient sunlight to ensure that maximum optical power is concentrated in one or more diffraction orders while minimizing residual power in other orders (e.g., the zeroth order indicative of the ambient light itself). An advantage of situating the diffraction gratings 50 on planar portions or aspects of the first and/or second surfaces 42, 46 of the cap 38 is that a constant blaze angle $\theta_B$ and a period 116 will result in consistent reflected and diffracted light produced from the diffraction grating 50.

The diffraction grating 50 of the cap 38 may be characterized by one or more periods 116 (also known as d in the standard nomenclature of diffraction gratings). In most aspects of the cap 38, the period 116 of the diffraction grating 50 is maintained between about 50 nm and about 5 microns. In general, the maximum wavelength that a given diffraction grating 50 can diffract is equal to about twice the period 116. Hence, a diffraction grating 50 with the period 116 that is maintained between about 50 nm and about 5 microns can diffract light in an optical range of 100 nm to about 10 microns. In a specific example, the period 116 of the diffraction grating 50 is maintained from about 150 nm to about 400 nm, ensuring that the diffraction grating 50 can efficiently diffract light in an optical range of about 300 nm to about 800 nm, roughly covering the visible spectrum.

Incident light 120 (typically ambient sun light) at an incident angle α is directed against a sawtooth-shaped diffraction grating 50 having a thickness 108, a period 116 and a blaze angle $\theta_B$. More particularly, a portion of the incident light 120 (preferably, a small portion) striking the diffraction grating 50 at an incident angle α is reflected as reflected light 120r at the same angle α, and the remaining portion of the incident light 120 is diffracted at particular wavelengths corresponding to diffracted light 120n, 120n+1, etc., at corresponding diffraction angles βn, βn+1, etc. The reflected light 120r is indicative of the zeroth order (i.e., n=0) and the diffracted light $120_n$, $120_{n+1}$, $120_{n+2}$ are indicative of the nth order diffraction according to standard diffraction grating terminology, where n is an integer corresponding to particular wavelengths of the reflected or diffracted light.

Figure 4C:
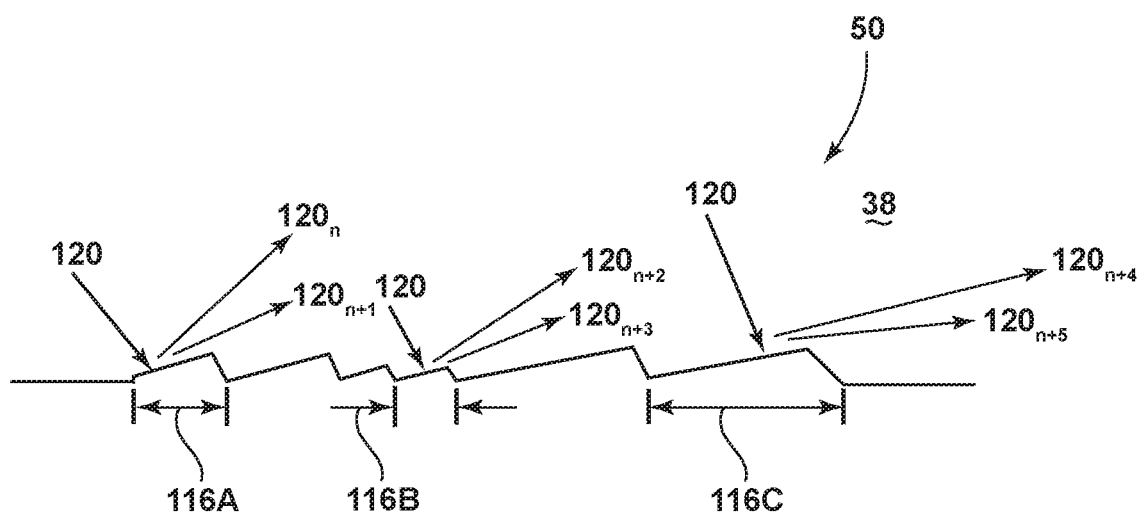
FIG. 4C is an enhanced view taken at section IVC of FIG. 3, according to one example.

Referring now to FIG. 4C, an example of the diffraction grating 50 employing varying periods (e.g., as including a set of periods) that can be employed in iridescent examples of the optical grating 50 is depicted in a cross-sectional form. In the depicted example, the diffraction grating 50 can have two or more sets of teeth or grooves, each having a particular period 116 that can produce light at unique or differing diffraction orders. As shown, the grating 50 is configured with three periods—period 116A, period 116B, and period 116C. One set of teeth of the diffraction grating 50 with a period of 116A can produce diffracted light $120_n$ and $120_{n+1}$, a different set of teeth with a period of 116B can produce diffracted light $120_{n+2}$ and $120_{n+3}$, and a third set of teeth with a period of 116C can produce diffracted light $120_{n+4}$ and $120_{n+5}$, all from the same incident light 120. Consequently, the diffraction grating 50, whether employed on first or second surfaces 42, 46 (FIG. 3) of the cap 38, advantageously can produce jewel-like effects of widely varying wavelengths within various regions of the cap 38. For example, the indicia, logos, etc. described above in connection with the shape of the optical gratings 50 may be produced with an iridescent appearance.

In some aspects, the diffraction grating 50 includes a varying period that varies between two to ten discrete values or, more preferably, between two to five discrete values across the diffraction grating 50. According to another aspect, the diffraction grating 50 with varying periods can be employed in one or more portions of the first and/or second surfaces 42, 46 of the cap 38, and one or more diffraction gratings 50 having a constant period are employed in other portions of the first and/or second surfaces 42, 46 of the cap 38 to create interesting, jewel-like appearance effects produced by the cap 38 employing the gratings 50. In another example, the diffraction grating 50 includes a varying period that changes between any number of values, only limited by the overall length of the grating 50 and/or the processing capabilities to develop such variability through precise control of mold dimensions. In another embodiment there may be a plurality of diffraction gratings 50 in a spaced apart configuration across the first and/or second surfaces 42, 46 of the cap 38. In such an example, the plurality of diffraction gratings 50 may have the same or a different period. In yet another example, the diffraction grating(s) 50 may substantially cover the first and/or second surfaces 42, 46 of the cap 38. In examples where diffraction gratings 50 are present on the second surface 46, the diffraction taking place on the second surface 46 may provide an aesthetically pleasing "depth" to the cap 38.

Figure 5:
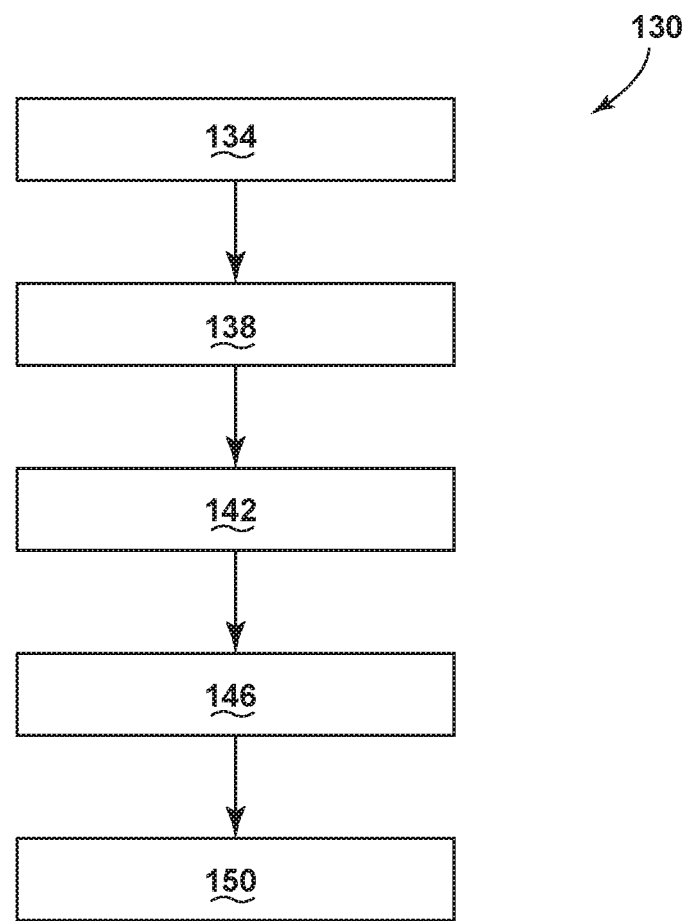
FIG. 5 is a flow diagram of a method, according to at least one example.

Referring now to FIG. 5, depicted is a method 130 of producing the wheel cap 26. The method 130 may begin with a step 134 of forming the base 34. In examples where the base is composed of a polymeric material, the step 134 may be forming the polymeric base 34. As explained above, the base 34 may be composed of a transparent, translucent and/or opaque material. The base 34 may be formed through injection molding, compression molding, transfer molding, blow molding, extrusion, machining and/or other techniques known in the art.

Next, a step 138 injection molding a substantially transparent polymer into a mold defining an optical grating feature may be performed. The mold may be composed of a metal such as steel, iron, aluminum, other metals and alloys thereof. The mold may define a cavity which generally has the shape of the cap 38. The substantially transparent polymer may be any of the materials described above in connection with the cap 38. The optical grating feature may be a plurality of grooves or features configured to create an imprint in the polymer to form the optical grating 50. The optical grating feature may include nanoscale optical details while maintaining pristine surface quality. Such an optical grating feature may be formed by using a short pulse femtosecond laser. Short pulse femtosecond lasers may include lasers which pulse infrared radiation (e.g., light having a wavelength of from about 700 nm to about 2700 nm) and/or ultraviolet light (e.g., light having a wavelength of about 400 nm or less) at a fast rate (e.g., as fast as $150 \times 10^{-15}$ sec). Such a laser may allow for very high peak powers with "Low" per pulse energy for a small laser spot size. The laser ablates a small amounts of material at a time to form the optical grating feature. Use of such a laser may be advantageous in allowing the mold to be cold ablated with no pressure meaning the there is virtually no heat affected zone created and little to no burrs. With this type of laser, features as thin as 100 nm thick with a Gaussian, square and/or triangular shape can be cut into the mold to create the optical grating feature. Using such a laser, the optical grating feature may be cut, or etched, with a ruled holographic or spaced holographic (sinusoidal) diffraction grating on the mold. In a specific example, the optical grating feature may have a ruled or holographic grating which is from about 400 nm to about 800 nm. This spacing refracts white light into the entire visible light spectrum. As such, the optical grating feature of the mold may be formed as a holographic grating or the optical grating feature of the mold may be formed as a diffraction grating.

During the method 130, and/or during the step 138, a step of heating the mold proximate the optical grating feature may be performed. Conventional plastics may not have the viscosity needed to fill the minute details of the optical grating feature that is laser machined into the mold. When most polymers are injected into a cold injection molding tool, the polymers will solidify before fully filling the minute details of the optical grating feature. To keep the viscosity of the polymer material low enough to fill the optical grating feature, the optical grating feature may be heated. The optical grating feature may be heated using resistance, steam, hot oil, induction or other methods capable of heating the mold proximate the optical grating feature.

Next, a step 142 of solidifying the polymer in the optical grating feature to form the cap 38 defining the optical grating 50 on a surface is performed. As the polymeric material within the mold cools, it solidifies to form the cap 38. In other words, because the cavity of the mold has the general shape of the cap 38, when the polymeric material solidifies within the mold, the material takes the shape of the cap 38. The portion of the polymeric material which is within the groves or features of the optical grating feature solidify in the shape of the optical grating feature to form the optical grating 50. As such, the optical grating is integrally defined by the cap 38.

Next, a step 146 of applying the cap decorative layer 80 on the surface around the optical grating 50 is performed. As explained above, the base decorative layer 84 may be composed of a film, ink, paint, an applique, dye and/or combinations thereof. The cap decorative layer 80 may be applied via spraying, dip coating, slot coating, hand application, physical vapor deposition, chemical vapor deposition and/or other methods known in the art. In vacuum metallized examples, a film of metallic material may be applied through physical or chemical vapor deposition. The optical gratings 50 may be masked off or otherwise covered to prevent the cap decorative layer 80 from covering the optical gratings 50. The cap decorative layer 80 may function to "window" the optical gratings 50. In other words, a viewer may only be able to see fully through the cap 38 through the optical gratings 50 because the cap decorative layer 80 is not transmissive. In yet other words, a viewer may only be able to see the base 34 and/or base decorative layer 84 through the optical gratings 50 when viewing the first surface 42 of the cap 38. It will be understood that additional or alternatively, a step of applying the base decorative layer 84 to the polymeric base 34 may also be performed. The base decorative layer 84 may be applied to the base 34 in any of the methods and techniques outlined above in connection with the cap decorative layer 80.

Next, a step 150 of coupling the surface (e.g., the second surface 46) of the cap 38 to the polymeric base 34 is performed. The cap 38 may be bonded, coupled or otherwise adhered to the base 34 through a variety of techniques including vibration welding, melting, mechanically coupling and/or other techniques. According to one or more examples, the step 150 may include applying an adhesive (e.g., the adhesive layer 88) to a perimeter of the polymeric base 34. As explained above, the adhesive layer 88 may include a variety of adhesive and be applied in a variety of manners to adhere the cap 38 to the base 34.

Use of the present disclosure may offer a variety of advantages. First, use of the diffraction examples of the optical gratings 50 may allow the wheel caps 26 to break apart white light like a prism, dispersing it into a rainbow of colors and sparkle and iridescence to wheel assemblies 14. Second, many appearances and unique imagery can be provided by changing the molded projected image 100 formed by the optical grating 50, tinting the cap 38 and/or changing the respective optical properties of the cap and base decorative layers 80, 84. Such a feature will allow the wheel caps 26 convey unique appearances that will appear hidden at first glance and then glisten and/or from the projected image 100 upon closer inspection. Third, use of holographic grating examples of the optical grating 50 reduces the use of conventional technologies like holographic film which may add significant cost and may reduce the clarity of the wheel cap 26.

According to various embodiments, a vehicle wheel assembly includes a wheel, a tire disposed around the wheel and a wheel cap coupled to the wheel. The wheel cap includes a polymeric base and a substantially transparent cap positioned on the base defining a first surface and a second surface, wherein the second surface integrally defines an optical grating. Embodiments of the vehicle wheel assembly can include any one or a combination of the following features:

- an adhesive is positioned around a perimeter of the polymeric base;
- the polymeric base defines one or more attachment features on an opposite side of the base than the substantially transparent cap;
- the polymeric base is opaque;
- the substantially transparent cap comprises polycarbonate;
- the first surface is closer to the wheel than the second surface;
- the optical grating is at least one of a holographic grating and a diffraction grating;
- the optical grating comprises a holographic grating;
- the optical grating comprises a diffraction grating;
- the wheel cap is directly coupled to the wheel;
- a hub cap positioned over a portion of the wheel; and/or
- the wheel cap is coupled to the hub cap.

According to various embodiments, a method of producing a wheel cap includes the steps: forming a polymeric base; injection molding a substantially transparent polymer into a mold defining an optical grating feature; solidifying the polymer in the optical grating feature to form a cap defining an optical grating on a surface; applying a cap decorative layer on the surface around the optical grating; and coupling the surface of the cap to the polymeric base. Embodiments of the method can include any one or a combination of the following features:

- the step of coupling the surface of the cap to the polymeric base further comprises: applying a base decorative layer to the polymeric base; and/or
- forming the optical grating feature of the mold as a holographic grating.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

What is claimed is:

1. A vehicle wheel assembly, comprising:
   a wheel;
   a tire disposed around the wheel; and
   a wheel cap coupled to the wheel, comprising:
      a polymeric base;
      a substantially transparent cap comprising an injection molded polymer and positioned on the polymeric base defining a first surface and a second surface, wherein the second surface integrally defines an optical grating; and
      a cap decorative layer on the second surface around the optical grating.

2. The vehicle wheel assembly of claim 1, wherein an adhesive is positioned around a perimeter of the polymeric base.

3. The vehicle wheel assembly of claim 1, wherein the polymeric base defines one or more attachment features on an opposite side of the base than the substantially transparent cap.

4. The vehicle wheel assembly of claim 1, wherein the polymeric base is opaque.

5. The vehicle wheel assembly of claim 1, wherein the substantially transparent cap comprises polycarbonate.

6. The vehicle wheel assembly of claim 1, wherein the second surface is closer to the wheel than the first surface.

7. The vehicle wheel assembly of claim 1, wherein the optical grating is at least one of a holographic grating and a diffraction grating.

8. The vehicle wheel assembly of claim 7, wherein the optical grating comprises a holographic grating.

9. The vehicle wheel assembly of claim 7, wherein the optical grating comprises a diffraction grating.

10. A vehicle wheel assembly, comprising:
    a wheel;
    a tire disposed around the wheel; and
    a wheel cap coupled to the wheel, comprising:
       a base decorative layer positioned on a polymeric base;
       a substantially transparent cap comprising an injection molded polymer and positioned on the base defining an inboard surface and an outboard surface, wherein the inboard surface is proximate the polymeric base and integrally defines a holographic grating; and
       a cap decorative layer positioned on the inboard surface around the holographic grating.

11. The vehicle wheel assembly of claim 10, wherein the wheel cap is directly coupled to the wheel.

12. The vehicle wheel assembly of claim 10, further comprising:
    a hub cap positioned over a portion of the wheel.

13. The vehicle wheel assembly of claim 12, wherein the wheel cap is coupled to the hub cap.

14. A method of producing a wheel cap, comprising the steps:
    forming a polymeric base;
    injection molding a substantially transparent polymer into a mold defining an optical grating feature;
    solidifying the polymer in the optical grating feature to form a cap defining an optical grating on a surface;
    applying a cap decorative layer on the surface around the optical grating; and
    coupling the surface of the cap to the polymeric base.

15. The method of claim 14, further comprising the step: applying a base decorative layer to the polymeric base.

16. The method of claim 14, further comprising the step of:
    forming the optical grating feature of the mold as a holographic grating.

17. The method of claim 14, further comprising the step of:
    forming the optical grating feature of the mold as a diffraction grating.

18. The method of claim 14, further comprising the step of:
    forming the optical feature using a femtosecond laser.

19. The method of claim 14, further comprising the step: applying an adhesive to a perimeter of the polymeric base.

20. The method of claim 14, wherein the step of injection molding a substantially transparent polymer into a mold defining an optical grating feature further comprises:
   heating the mold proximate the optical grating feature.

\* \* \* \* \*